United States Patent
Brennan et al.

(10) Patent No.: US 8,042,385 B2
(45) Date of Patent: Oct. 25, 2011

(54) SYNCHRONIZATION DIAGNOSTIC SYSTEMS AND METHODS FOR ENGINE CONTROLLERS

(75) Inventors: Daniel G. Brennan, Brighton, MI (US); Jason T. Davis, Williamston, MI (US); David S. Mathews, Howell, MI (US); Kevin J. Storch, Brighton, MI (US)

(73) Assignee: GM Global Technology Operations LLC

( * ) Notice: Subject to any disclaimer, the term of this patent is extended or adjusted under 35 U.S.C. 154(b) by 163 days.

(21) Appl. No.: 12/556,163

(22) Filed: Sep. 9, 2009

(65) Prior Publication Data

US 2011/0056278 A1    Mar. 10, 2011

(51) Int. Cl.
*G01M 15/04* (2006.01)

(52) U.S. Cl. ................................... 73/114.61

(58) Field of Classification Search .............. 73/114.26, 73/114.27, 114.28, 114.61, 114.63
See application file for complete search history.

(56) References Cited

U.S. PATENT DOCUMENTS

| | | | | |
|---|---|---|---|---|
| 3,702,601 | A * | 11/1972 | Gordon et al. | 123/490 |
| 4,100,895 | A * | 7/1978 | Hattori et al. | 123/406.66 |
| 4,338,813 | A * | 7/1982 | Hunninghaus et al. | 73/114.27 |
| 4,338,903 | A * | 7/1982 | Bolinger | 123/476 |
| 4,644,284 | A * | 2/1987 | Friedline et al. | 324/397 |
| 6,502,550 | B1 * | 1/2003 | Kotwicki et al. | 123/406.47 |
| 7,865,290 | B2 * | 1/2011 | Gibson et al. | 701/103 |
| 2009/0093939 | A1 * | 4/2009 | Gibson et al. | 701/102 |

* cited by examiner

*Primary Examiner* — Freddie Kirkland, III

(57) ABSTRACT

An engine controller diagnostic system includes a cylinder identification (ID) comparison module and a synchronization diagnostic module. The cylinder ID comparison module compares a first cylinder ID associated with a first controller with a second cylinder ID associated with a second controller. The synchronization diagnostic module determines a synchronization status of the first controller based on a comparison between the first cylinder ID and the second cylinder ID.

20 Claims, 4 Drawing Sheets

SYNCHRONIZATION DIAGNOSTIC SYSTEMS AND METHODS FOR ENGINE CONTROLLERS

FIELD

The present disclosure relates to synchronization diagnostic systems and methods for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

More than one engine controller may be used to control an internal combustion engine. For example, in an engine with dual controllers, each controller may control half of the cylinders. The controllers determine a phase relationship between a camshaft and a crankshaft separately during a synchronization process when the engine is started. Fuel injection and spark timing for a front bank of cylinders and a back bank of cylinders are determined based on the phase relationship. Improper controller synchronization may result in improper fuel injector and spark plug scheduling.

For an engine with a single controller, improper controller synchronization may prevent the engine from starting. However, for an engine with dual engine controllers, an engine may be started when only one controller is synchronized. Cylinders associated with the properly-synchronized controller may provide enough power to drive the other cylinders associated with an improperly-synchronized controller. Consequently, fuel injection and spark timing for the other cylinders may not be controlled based on a predetermined schedule.

SUMMARY

An engine controller diagnostic system includes a cylinder identification (ID) comparison module and a synchronization diagnostic module. The cylinder ID comparison module compares a first cylinder ID associated with a first controller with a second cylinder ID associated with a second controller. The synchronization diagnostic module determines a synchronization status of the first controller based on a comparison between the first cylinder ID and the second cylinder ID.

In one feature, the engine controller diagnostic system includes a plurality of engine diagnostic modules. The synchronization diagnostic module determines the synchronization status of the first controller based on at least one signal from the plurality of engine diagnostic modules.

In other features, the plurality of engine diagnostic modules include a camshaft position sensor diagnostic module, an ignition system diagnostic module, an exhaust monitoring module, a rail pressure monitoring module, and a fuel injector diagnostic module. The synchronization diagnostic module determines that the first controller is correctly synchronized when the at least one signal indicates no fault in associated engine components.

A method of diagnosing an engine controller includes: comparing a first cylinder identification (ID) associated with a first controller and a second cylinder ID associated with a second controller; and determining a synchronization status of the first controller based on a comparison between the first cylinder ID and the second cylinder ID.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
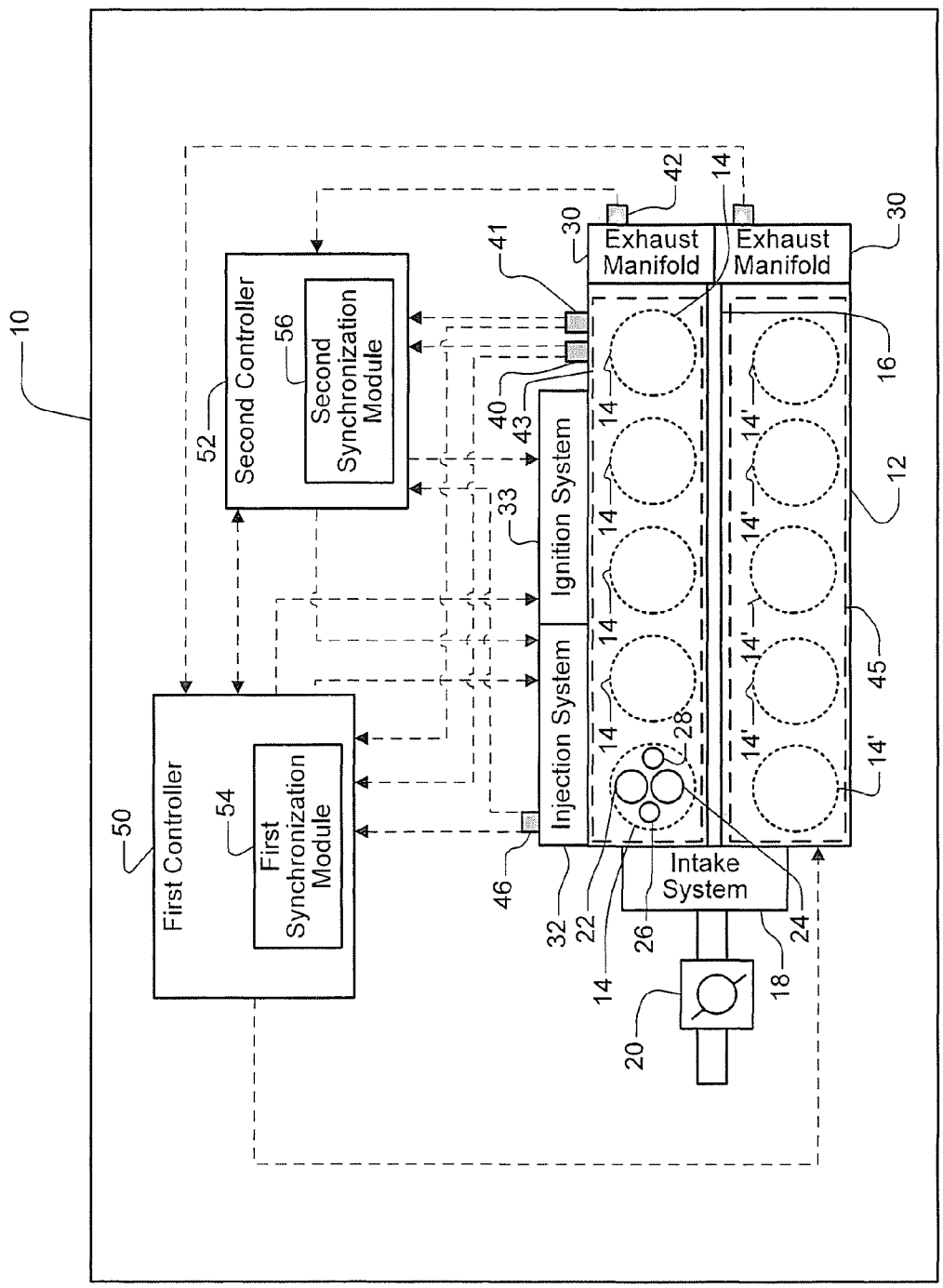
FIG. 1 is a functional block diagram of an engine system that includes a first controller and a second controller each including a synchronization module according to the teachings of the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

A synchronization diagnostic system for diagnosing a dual controller engine system compares a first cylinder ID associated with a first controller with a second cylinder ID associated with a second controller. When the first and second cylinder IDs are out of phase with each other, the synchronization diagnostic system may determine whether the first controller is properly synchronized based on various engine diagnostics.

Referring now to FIG. 1, an engine system 10 includes an engine 12 that combusts an air and fuel mixture to produce drive torque. The engine 12 includes a plurality of cylinders 14 and 14' that are arranged in two banks and are connected to a crankshaft 16. Although ten cylinders 14 and 14' are illustrated in the engine 12, the engine 12 may include any number of cylinders including, but not limited to, 2, 4, 5, 6, 8, 12, 14, 16 or 18.

Air is drawn into an intake manifold 18 through a throttle 20. The throttle 20 regulates mass air flow into the intake manifold 18. Air within the intake manifold 18 is distributed into the cylinders 14 and 14'. Each cylinder 14 or 14 includes an intake valve 22, an exhaust valve 24, a fuel injector 26, and a spark plug 28. The fuel injectors 26 inject fuel that is combined with the air as the air is drawn into the cylinders 14 and 14' through intake ports. The intake valves 22 are selectively opened and closed to enable the air/fuel mixture to enter the cylinders 14 and 14'. A piston (not shown) compresses the air/fuel mixture within each cylinder 14 or 14'. The spark plugs 28 initiate combustion of the air/fuel mixture, driving the pistons in the cylinders 14 and 14'. The pistons drive the crankshaft 16 to produce drive torque. Combustion exhaust within the cylinders 14 and 14' is forced out exhaust ports when the exhaust valves 24 are opened. The exhaust is delivered to an exhaust manifold 30 and is treated in an exhaust system (not shown).

The engine system 10 further includes an injection system 32 and an ignition system 33. The injection system 32 may include a fuel pump and a fuel rail (both not shown). The injection system 32 supplies a predetermined amount of fuel to the fuel injectors 26. Timing for opening and closing the intake valves 22 and the exhaust valves 24 is controlled by a camshaft (not shown). The ignition system 33 energizes the spark plug 28 to ignite a combustion charge in the cylinders 14 and 14'. The camshaft is synchronized to the crankshaft 16. A phase relationship between the camshaft and the crankshaft 16 with respect to each cylinder 14 is determined during a synchronization process upon engine start. The fuel injection timing and the ignition timing are determined based on the phase relationship.

A plurality of sensors are provided at the engine system 10 to monitor engine operating conditions. The plurality of sensors include, but are not limited to, a crankshaft position sensor 40, a camshaft position sensor 41, a first oxygen sensor 42, a second oxygen sensor 44, and a fuel rail pressure sensor 46. The crankshaft position sensor 40 monitors the rotational position of the crankshaft 16. The camshaft position sensor 41 monitors the rotational position of the camshaft. The first oxygen sensor 42 is provided at the exhaust manifold 30 associated with a first bank 43 of cylinders 14 and monitors an oxygen concentration of the exhaust gas associated with the first bank 43 of cylinders 14. The second oxygen sensor 44 is provided at the exhaust manifold 30 associated with a second bank 45 of cylinders 14' and monitors the oxygen concentration in the exhaust gas associated with the second bank 45 of cylinders 14'. The fuel rail pressure sensor 46 monitors the fuel rail pressure.

A first controller 50 and a second controller 52 independently control the first bank 43 of cylinders 14 and the second bank 45 of cylinders 14', respectively. For example, in an engine that includes 10 cylinders, the first controller 50 may control cylinder numbers 1, 2, 3, 4, 5 and the second controller 52 may control cylinder numbers 6, 7, 8, 9, 10. The first and second controllers 50 and 52 receive signals from the plurality of sensors to monitor the engine operating conditions and control the associated cylinders 14 and 14' separately.

The first and second controllers 50 and 52 include a first and second synchronization modules 54 and 56, respectively. The first and second synchronization modules 54 and 56 each start a synchronization process when an ignition switch is turned on. During synchronization, the first and second controllers 50 and 52 each determine a cylinder identification (ID) and consequently a phase relationship between the camshaft and the crankshaft 16 associated with their respective cylinders 14 or 14'. Cylinder ID identifies a reference cylinder based on which a firing order of the cylinders is determined.

Generally, cylinder ID identifies the cylinder that is in the compression stroke and near the top dead center (TDC) (for example, 60-80 crank degrees before TDC) when the starter motor starts to drive the engine. Cylinder ID is a variable in the engine controller and indicates which cylinder is currently near TDC and at the end of the compression stroke. For a four-stroke engine, a crankshaft rotates twice per firing cycle (engine cycle). Therefore, a piston is at TDC twice per engine cycle (i.e., once at the end of the compression stroke and once at the end of the exhaust stroke). The controller may be incapable of determining when the piston is at the TDC and at the end of the compression stroke by using the crankshaft position sensor 40 alone. A cam shaft rotates once per engine cycle. Therefore, a camshaft position sensor 41 is generally used with the crankshaft position sensor 40 to determine which cylinder is near the TDC and in the compression stroke. By sampling electrical signals from both the crankshaft position sensor 40 and the camshaft position sensor 41, the engine controller may correctly identify the cylinder that is currently near the TDC and at the end of the compression stroke. This cylinder is used as a reference cylinder. The sequence of power delivery of each cylinder in an engine is predetermined. Therefore, when the reference cylinder is identified, the firing order of the cylinders and the phase relationship between the camshaft 16 and the crankshaft may be determined.

In an engine with dual controllers, the first and second controllers 50 and 52 each identify a respective reference cylinder and assign fuel injection timing and ignition timing to their respective cylinders 14 or 14' based on the phase relationship. When a controller properly determines a phase relationship with respect to the associated cylinders, the assigned fuel injection timing and ignition timing are in phase relative to the associated cylinders. Therefore, the controller is properly synchronized. The engine 12 may start to generate power and run independently of a starter motor.

Under certain circumstances, the signals from the crankshaft position sensor 40 and the camshaft position sensor 41 to the engine controller may become noisy and sampling of the signals by the engine controller may be corrupted. As a result, the engine controller may incorrectly determine a piston is at the TDC in the compression stoke when in fact the piston is at the TDC, but in the exhaust stroke. When the engine controller incorrectly identifies the reference cylinder, the assigned fuel injection timing and ignition timing for the associated cylinders are out of phase relative to the other bank of cylinders. Therefore, the controller becomes improperly synchronized.

The first and second synchronization modules 54 and 56 each compare a respective cylinder identification (ID) with a cylinder ID from the other synchronization module. The synchronization modules 54 and 56 are diagnosed based on the comparison and signals from a plurality of engine diagnostic modules.

Figure 2:
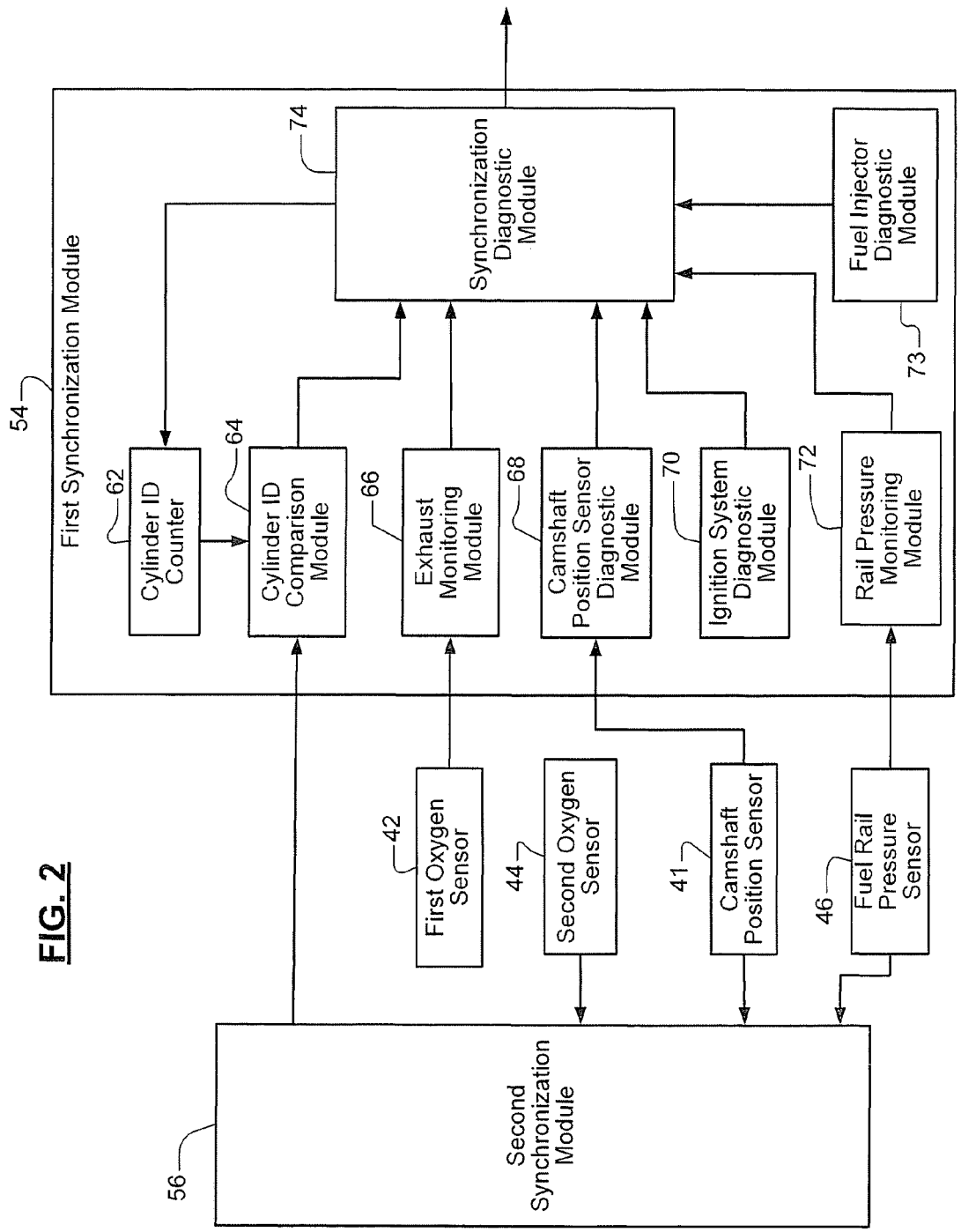
FIG. 2 is a functional block diagram of a first synchronization module of a first controller according to the teachings of the present disclosure.

Referring now to FIG. 2, the first synchronization module 54 communicates with the second synchronization module 56. The first synchronization diagnostic module 54 includes a cylinder ID counter 62, a cylinder ID comparison module 64, an exhaust monitoring module 66, a camshaft position sensor diagnostic module 68, an ignition system diagnostic module 70, a rail pressure monitoring module 72, a fuel injector diagnostic module 73, and a synchronization diagnostic module 74. While not shown in the drawings, the second synchronization diagnostic module 56 includes similar modules that perform similar functions and diagnoses.

The cylinder ID counter 62 records a cylinder ID associated with the first bank 43 of cylinders 14 based on signals from the camshaft position sensor 40 and the crankshaft position sensor 41. The cylinder ID comparison module 64 receives a cylinder ID associated with the second bank 45 of cylinders 14' from a cylinder ID counter of the second synchronization module 56. The cylinder ID comparison module 64 compares the cylinder IDs of both controllers 50 and 52. For example, the first controller 50 may identify cylinder number 1 as the reference cylinder and the second controller 52 may identify cylinder number 10 as the reference cylinder. Regardless of which cylinder is identified as the reference cylinder, the reference cylinder in the first bank of cylinders 14 has a predetermined phase relationship relative to the reference cylinder in the second bank of cylinders 14'. The cylinder ID comparison module 64 may compare the first and second cylinder IDs and determine whether the first and the second cylinder IDs are in phase or out of phase with each other. When the first and second cylinder IDs are in phase with each other, both controllers 50 and 52 are correctly synchronized. When the first and second cylinder IDs are out of phase with each other, the first controller 50 or the second controller 52 or both may not be properly synchronized. For example, in the improperly synchronized controller, the phase relationship between the crankshaft 16 and the camshaft associated with associated cylinders 14 or 14' may be, for example, 180° out of phase. Therefore, the cylinder ID associated with the improperly-synchronized controller may be advanced by a value equal to a total number of cylinders over 2.

When the engine 12 is running independently of the starter motor and the cylinder IDs are out of phase with each other, the cylinder ID comparison module 64 determines that one of the controllers 50 and 52 is improperly synchronized.

The exhaust monitoring module 66 communicates with a first oxygen sensor 42 to monitor an oxygen concentration of the exhaust gas from the first bank 43 of cylinders 14. The exhaust monitoring module 66 determines whether the first bank 43 of cylinders 14 are operated in a lean, homogeneous, or rich condition. When the oxygen concentration of the exhaust gas exceeds a threshold, for example, which may indicate a very lean exhaust, the exhaust monitoring module 66 may generate and send a fault signal to the synchronization diagnostic module 74.

Generally, when a controller is not synchronized, the fuel injection timing and the spark timing are not scheduled properly. For example, the fuel injection may be scheduled in an expansion stroke of an engine cycle. As such, the fuel in the cylinders 14 associated with the improperly synchronized controller may not be combusted as desired. Therefore, the exhaust gas from the cylinders 14 associated with the improperly-synchronized controller may have an oxygen concentration that exceeds a threshold indicative of a very lean exhaust.

The camshaft position sensor diagnostic module 68 determines whether the camshaft position sensor 41 is functioning properly. A controller determines a phase relationship between the crankshaft 16 and the camshaft based on signals from the crankshaft position sensor 40 and the camshaft position sensor 41. When the camshaft position sensor 41 fails, the controller may not be synchronized properly. The camshaft position sensor diagnostic module 68 generates and sends a fault signal to the synchronization diagnostic module 74 when the camshaft position sensor 41 fails.

The ignition system diagnostic module 70 determines whether the ignition system 33 is functioning properly. The ignition system diagnostic module 70 generates and sends a fault signal to the synchronization diagnostic module 74 when the ignition system 33 fails.

The rail pressure monitoring module 72 may be used in a direct injection engine to monitor a fuel rail pressure of the fuel rail. When the rail pressure is not within a desired range, the rail pressure monitoring module 72 generates and sends a fault signal to the synchronization diagnostic module 74.

The fuel injector diagnostic module 73 monitors the fuel injectors. The fuel injector diagnostic module 73 generates and sends a fault signal to the synchronization diagnostic module 74 when the fuel injectors fail.

The synchronization diagnostic module 74 determines whether the associated controller (i.e., the first controller 54) is properly synchronized based on at least one of a comparison between the cylinder IDs and signals from the engine diagnostic modules. The engine diagnostic modules include, but are not limited to, the exhaust monitoring module 66, the camshaft position sensor diagnostic module 68, the ignition system diagnostic module 70, the rail pressure monitoring module 72, and the fuel injector diagnostic module 73. The synchronization diagnostic module 74 may be activated to start a synchronization diagnosis when the engine speed is within a predetermined range, for example, between 20 RPM and 1500 RPM.

The synchronization diagnostic module 74 may determine that the associated controller (i.e., the first controller 50) is properly synchronized in one of two situations. In the first situation, the first and second cylinder IDs are in phase with each other. In the second situation, the first and second cylinder IDs are out of phase with each other. However, the synchronization diagnostic module 74 does not receive any fault signal from any of the exhaust monitoring module 66, the camshaft position sensor diagnostic module 68, the ignition system diagnostic module 70, the rail pressure monitoring module 72, and the fuel injector diagnostic module 73. Therefore, the synchronization diagnostic module 74 may determine that the associated first controller 50 is properly synchronized.

When the exhaust monitoring module 66 and/or the camshaft position sensor diagnostic module 68 generates a fault signal, the first controller 54 may or may not be synchronized properly. The synchronization diagnostic module 74 may command the associated cylinder ID counter 62 to increment the first cylinder ID, for example, by a value equal to the cylinder number over 2 to correct the cylinder ID.

When the ignition system diagnostic module 70 and/or the fuel injector diagnostic module 73 diagnoses a fault in the spark plugs and/or the fuel injectors, the spark plugs and/or the fuel injectors may be disabled.

The second synchronization module 56 runs a similar diagnosis and determines whether the second controller 52 is properly synchronized. The synchronization diagnostic modules 74 of the first and second controllers 50 and 52 may receive diagnostic results from each other.

Figure 3A:
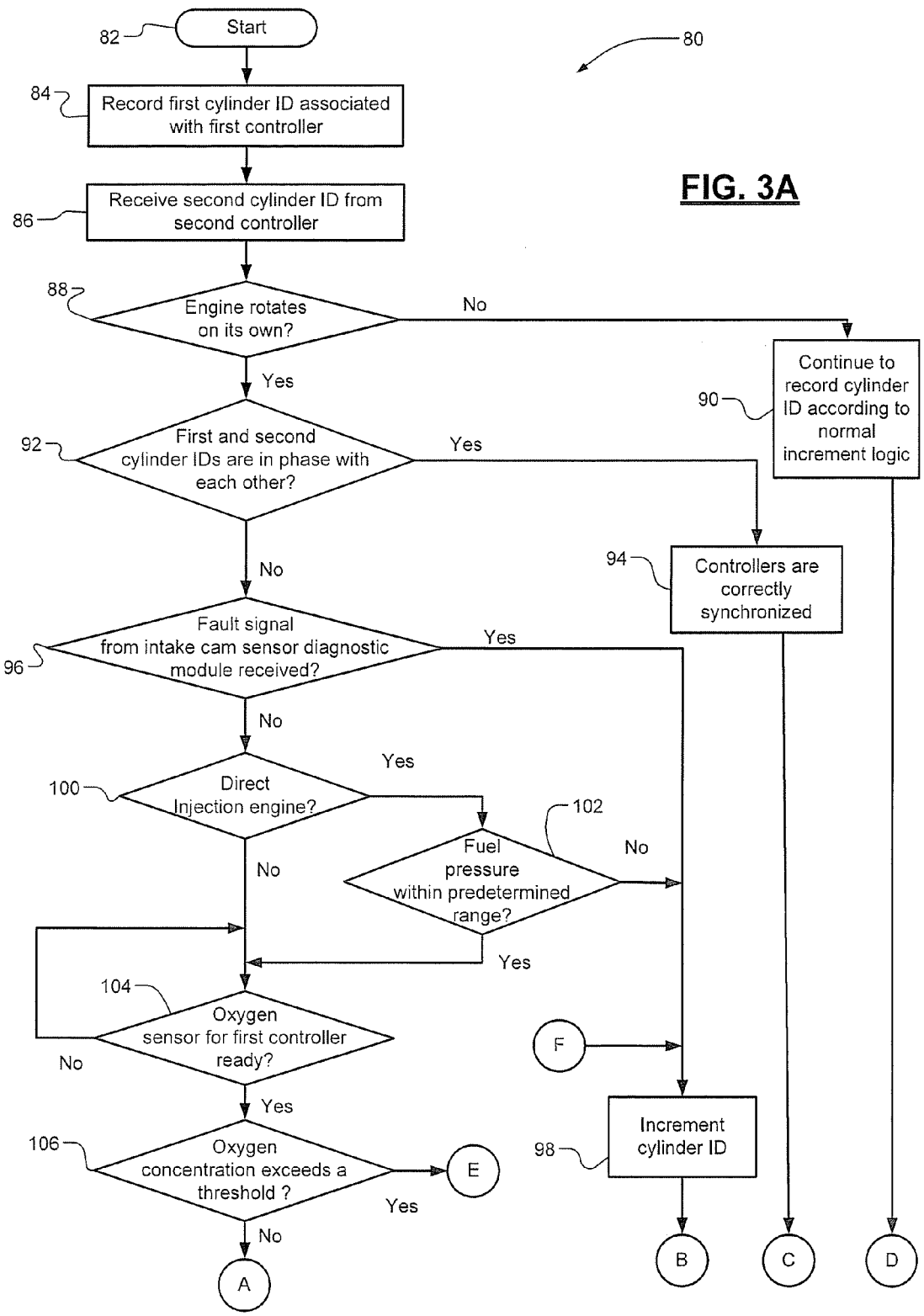
FIGS. 3A and 3B are flow diagrams illustrating a method for diagnosing synchronization of a controller according to the teachings of the present disclosure.
Figure 3B:
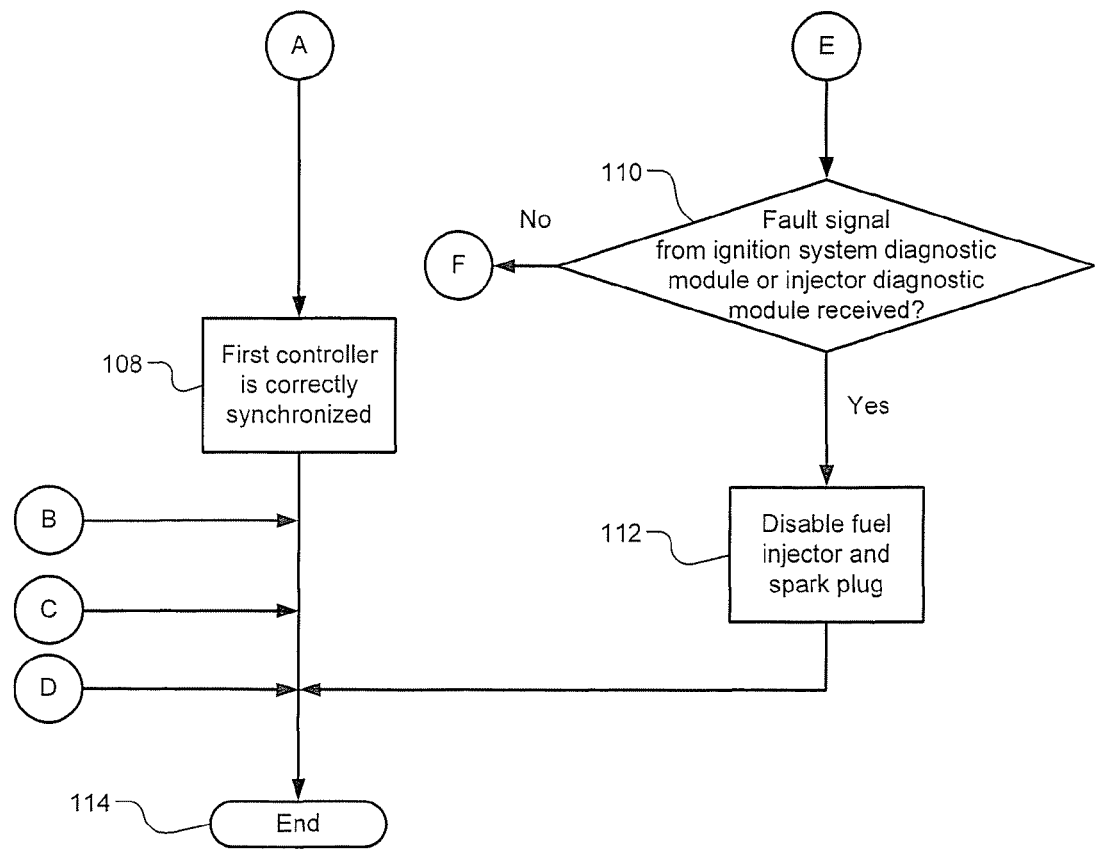

Referring now to FIGS. 3A and 3B, a method 80 for diagnosing a controller (i.e., the first controller 50) starts in step 82. The cylinder ID counter 62 records a first cylinder ID associated with the first controller 50 in step 84. The cylinder ID comparison module 64 receives the first cylinder ID and a second cylinder ID from the second controller 52 in step 86. In step 88, the first controller 50 determines whether the engine 12 is running on its own (i.e., independently of the starter motor) in step 88. If the engine 12 is not running independently in step 88, both controllers 50 and 52 have yet to be synchronized. Therefore, the cylinder ID counter 62 continues to record the first cylinder ID according to normal cylinder ID increment logic in step 90.

When the engine 12 is running independently in step 88, at least one of the first and second controllers 50 and 52 is synchronized. The cylinder ID comparison module 64 determines whether the first and second cylinder IDs are in phase with each other in step 92. If the cylinder IDs are in phase with each other in step 92, the synchronization diagnostic module 74 determines that the first and second controllers 50 and 52 are properly synchronized in step 94. Otherwise, the synchronization diagnostic module 74 determines whether a fault signal from the camshaft position sensor diagnostic module 68 is received in step 96. If a fault signal is received in step 96, the method goes to step 98. In step 98, the synchronization diagnostic module 74 commands the cylinder ID counter 62 to increment the first cylinder ID by a value equal to a total number of cylinders over 2. If no fault signal is received in step 96, the first controller 50 determines whether the engine is a direct injection engine in step 98.

If the engine 12 is a direct injection engine, the rail pressure monitoring module 72 determines whether the fuel rail pressure is within the predetermined range in step 102. If not, the method 80 goes to step 98. If the engine 12 is not a direction injection engine in step 100 or if the fuel rail pressure is within the predetermined range in step 102, the method 80 goes to step 104.

The exhaust monitoring module 66 determines whether the first oxygen sensor 42 associated with the first controller 50 is ready in step 104. If the first oxygen sensor 42 is ready is step 104, the exhaust monitoring module 66 determines whether the oxygen concentration in the exhaust gas exceeds a threshold in step 106. If the oxygen concentration exceeds the threshold, the method 80 goes to step 110. If the oxygen concentration does not exceed the threshold, the synchronization diagnostic module 74 determines that the first controller 50 is correctly synchronized in step 108.

In step 110, the synchronization diagnostic module 74 determines whether a fault signal from the ignition system diagnostic module 70 and/or the fuel injector diagnostic module 73 is received. If a fault signal is received, the fuel injector 26 and/or the spark plug 28 is disabled to protect the engine 12 in step 112. If no fault signal is received in step 110, the method 80 goes to step 98. The method 80 ends in step 114.

Similarly, the method for diagnosing the second controller 52 includes similar steps. The second controller 52 may include a similar synchronization diagnostic module to diagnose synchronization of the second controller 52.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. An engine controller diagnostic system comprising:
a cylinder identification (ID) comparison module that compares a first cylinder ID associated with a first controller with a second cylinder ID associated with a second controller;
a plurality of engine diagnostic modules that comprise a camshaft position sensor diagnostic module, an ignition system diagnostic module, an exhaust monitoring module, a fuel rail pressure monitoring module, and a fuel injector diagnostic module; and
a synchronization diagnostic module that determines a synchronization status of the first controller based on (i) a comparison between the first cylinder ID and the second cylinder ID and (ii) at least one signal from at least one of the plurality of engine diagnostic modules,
wherein the synchronization diagnostic module determines that the first controller is correctly synchronized when the first cylinder ID and the second cylinder ID are out of phase with each other and the at least one signal indicates no faults in engine components associated with the plurality of engine diagnostic modules.

2. The engine controller diagnostic system of claim 1 wherein the exhaust monitoring module generates the at least one signal when an oxygen concentration of an exhaust gas exceeds a threshold.

3. The engine controller diagnostic system of claim 1 wherein the fuel rail pressure monitoring module generates the at least one signal when a fuel rail pressure is outside a predetermined range.

4. The engine controller diagnostic system of claim 1 further comprising a cylinder ID counter associated with the first controller, wherein the cylinder ID counter increments the first cylinder ID when the synchronization diagnostic module determines that the first controller is not correctly synchronized.

5. The engine controller diagnostic system of claim 4 wherein the cylinder ID counter increments the first cylinder ID by a value equal to a total number of cylinders over 2.

6. The engine controller diagnostic system of claim 1 wherein at least one of a fuel injector and a spark plug is disabled when at least one of the ignition system diagnostic module and the fuel injector diagnostic module diagnoses a fault in the at least one of the fuel injector and the spark plug.

7. The engine controller diagnostic system of claim 1 wherein the synchronization diagnostic module determines that the first controller is correctly synchronized when the first cylinder ID and the second cylinder ID are in phase with each other.

8. A method of diagnosing an engine controller comprising:
comparing a first cylinder identification (ID) associated with a first controller and a second cylinder ID associated with a second controller; and
determining a synchronization status of the first controller based on (i) a comparison between the first cylinder ID and the second cylinder ID and (ii) at least one signal from at least one of a plurality of engine diagnostic modules that comprise a camshaft position sensor diagnostic module, an ignition system diagnostic module, an exhaust monitoring module, a rail pressure monitoring module, and a fuel injector diagnostic module,
wherein the first controller is correctly synchronized when the first cylinder ID and the second cylinder ID are out of phase with each other and the at least one signal indicates no faults in engine components associated with the plurality of engine diagnostic modules.

9. The method of claim 8 wherein the exhaust monitoring module generates the at least one signal when an oxygen concentration of an exhaust gas exceeds a threshold.

10. The method of claim 8 wherein the rail pressure monitoring module generates the at least one signal when a rail pressure is outside a predetermined range.

11. The method of claim 8 further comprising incrementing the first cylinder ID when the first controller is not correctly synchronized.

12. The method of claim 11 further comprising incrementing the first cylinder ID by a value equal to a total number of cylinders over 2.

13. A control system for an engine, the control system comprising:
a first control module that controls N cylinders of the engine, wherein the engine includes M cylinders, wherein N is an integer greater than zero, and wherein M is an integer greater than N;
a second control module that controls (M-N) cylinders of the engine; and
a synchronization module that determines whether the first and second control modules are synchronized based on (i) camshaft position and (ii) crankshaft position.

14. The control system of claim 13, wherein the synchronization module determines first and second cylinder identifications (IDs) based on the camshaft position and crankshaft position, wherein the first and second cylinder IDs indicate next cylinders in a firing order of the N and (M-N) cylinders, respectively, and wherein the synchronization module determines whether the first and second control modules are synchronized based on a phase relationship between the first and second cylinder IDs.

15. The control system of claim 13, wherein the synchronization module determines whether the first and second control modules are synchronized further based on first and second exhaust gas oxygen concentrations, wherein the first and second oxygen gas concentrations correspond to exhaust gases produced by the N and (M-N) cylinders, respectively.

16. The control system of claim 13, wherein the synchronization module determines whether the first and second control modules are synchronized further based on first and second fuel rail pressures, wherein the first and second fuel rail pressures correspond to fuel rails associated with the N and (M-N) cylinders, respectively.

17. The control system of claim 13, wherein the synchronization module increments a cylinder identification (ID) counter when the first and second control modules are determined not to be synchronized.

18. The control system of claim 17, wherein the synchronization module compares the cylinder ID counter to a predetermined threshold, wherein the synchronization module increments a cylinder ID of the first control module when the cylinder ID counter is less than or equal to the predetermined threshold, and wherein the cylinder ID indicates a next cylinder in a firing order of the N cylinders associated with the first control module.

19. The control system of claim 18, wherein the synchronization module increments the cylinder ID by M/2.

20. The control system of claim 13, wherein N equals M/2.

* * * * *